(12) United States Patent
Yokoyama et al.

(10) Patent No.: US 9,926,938 B2
(45) Date of Patent: Mar. 27, 2018

(54) VARIABLE GEOMETRY TURBOCHARGER

(71) Applicant: MITSUBISHI HEAVY INDUSTRIES, LTD., Tokyo (JP)

(72) Inventors: Takao Yokoyama, Tokyo (JP); Katsuyuki Osako, Tokyo (JP); Isao Tomita, Tokyo (JP); Yasuaki Jinnai, Tokyo (JP); Masaki Tojo, Tokyo (JP); Satomi Nagae, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 706 days.

(21) Appl. No.: 14/381,237

(22) PCT Filed: Feb. 26, 2013

(86) PCT No.: PCT/JP2013/054984
§ 371 (c)(1),
(2) Date: Aug. 27, 2014

(87) PCT Pub. No.: WO2013/129407
PCT Pub. Date: Sep. 6, 2013

(65) Prior Publication Data
US 2015/0104296 A1    Apr. 16, 2015

(30) Foreign Application Priority Data

Feb. 29, 2012   (JP) .................................. 2012-043683

(51) Int. Cl.
*F04D 27/00*       (2006.01)
*F02B 37/24*       (2006.01)
(Continued)

(52) U.S. Cl.
CPC ........... *F04D 27/002* (2013.01); *F01D 5/141* (2013.01); *F01D 17/16* (2013.01); *F01D 17/165* (2013.01);
(Continued)

(58) Field of Classification Search
None
See application file for complete search history.

(56) References Cited

U.S. PATENT DOCUMENTS 4,629,396 A *  12/1986  Lorett ................... F01D 17/165
                                                      415/164
8,016,551 B2 *  9/2011  Lin ......................... F01D 9/045
                                                      415/163
(Continued)

FOREIGN PATENT DOCUMENTS

DE     10 2009 006 209 A1    8/2010
DE     10 2009 020 591 A1   11/2010
(Continued)

OTHER PUBLICATIONS

Office Action dated Dec. 23, 2015 issued in the corresponding Chinese Application No. 201380011157.8 with an English Translation.
(Continued)

*Primary Examiner* — Logan Kraft
*Assistant Examiner* — Jason Davis
(74) *Attorney, Agent, or Firm* — Birch, Stewart, Kolasch & Birch, LLP

(57) ABSTRACT

In a variable geometry turbocharger including a variable nozzle mechanism, an object is to enhance safety upon malfunction of the variable nozzle mechanism as well as to improve accuracy in the control of the variable nozzle mechanism by applying a moment that acts on the nozzle vanes in an opening direction securely and stably. A variable geometry turbocharger includes a plurality of nozzle vanes 41a disposed at predetermined intervals around a rotational shaft center of a turbine wheel 7 so as to surround an outer circumferential side of the turbine wheel 7 and a variable nozzle mechanism configured capable of changing a blade angle of each of the nozzle vanes 41a, each of the nozzle (Continued)

vanes 41*a* having a blade cross-section orthogonal to a nozzle shaft 41*b* of each nozzle vane 41*a*, the blade cross-section having: a concave portion 53 curved into a concave shape on at least a part of a pressure surface 45 side, the part being disposed at a trailing edge 51 side with respect to the rotational center C; and a convex portion at a leading edge 49 side with respect to the rotational center C, so that a surface shape of the pressure surface 45 side is a substantially S-shape having the concave portion and the convex portion across a boundary at a same longitudinal position as the rotational center.

5 Claims, 7 Drawing Sheets

(51) Int. Cl.
*F01D 17/16* (2006.01)
*F01D 5/14* (2006.01)
*F02B 37/22* (2006.01)
*F02C 6/12* (2006.01)

(52) U.S. Cl.
CPC .............. *F02B 37/22* (2013.01); *F02B 37/24* (2013.01); *F02C 6/12* (2013.01); *F05D 2220/40* (2013.01); *F05D 2250/712* (2013.01); *F05D 2250/713* (2013.01); *F05D 2250/75* (2013.01); *Y02T 10/144* (2013.01)

(56) References Cited

U.S. PATENT DOCUMENTS

| 8,109,715 B2* | 2/2012 | Renaud | F01D 5/141 |
| | | | 415/160 |
| 8,641,382 B2* | 2/2014 | Weber | F01D 17/165 |
| | | | 416/223 A |
| 9,140,134 B2* | 9/2015 | Boening | F01D 17/165 |
| 2005/0220616 A1 | 10/2005 | Vogiatzis et al. | |
| 2008/0131267 A1 | 6/2008 | Renaud et al. | |
| 2008/0271449 A1 | 11/2008 | Roberts et al. | |
| 2010/0098529 A1 | 4/2010 | Roby et al. | |
| 2010/0296924 A1 | 11/2010 | Böning et al. | |
| 2011/0142600 A1 | 6/2011 | Winkler et al. | |

FOREIGN PATENT DOCUMENTS

| EP | 1 790 830 A1 | 5/2007 |
| EP | 1904730 B1 | 12/2008 |
| EP | 2 241 722 A1 | 10/2010 |
| JP | 2002-508467 A | 3/2002 |
| JP | 2003-254074 A | 9/2003 |
| JP | 2005-351241 A | 12/2005 |
| JP | 2007-524022 A | 8/2007 |
| JP | 2008-520881 A | 6/2008 |
| JP | 2009-74542 A | 4/2009 |
| JP | 2009-517578 A | 4/2009 |
| JP | 2009-215990 A | 9/2009 |
| JP | 2010-112223 A | 5/2010 |
| JP | 2010-203239 A | 9/2010 |
| JP | 2010-216283 A | 9/2010 |
| JP | 2011-509371 A | 3/2011 |
| JP | 2012-052525 A | 3/2012 |

OTHER PUBLICATIONS

Notice of Allowance dated Aug. 12, 2016 issued in corresponding Chinese Application No. 201380011157.8 with an English Translation.
International Preliminary Report on Patentability and Written Opinion of the International Searching Authority (Forms PCT/IB/338, PCT/IB/326, PCT/IB/373 and PCT/ISA/237), dated Sep. 12, 2014, for International Application No. PCT/JP2013/054984, including English translation thereof.
International Search Report and Written Opinion of the International Searching Authority (Forms PCT/ISA/210, PCT/ISA/220 and PCT/ISA/237), dated May 14, 2013, for International Application No. PCT/JP2013/054984.
Extended European Search Report dated Dec. 14, 2015 issued in the corresponding EP Application No. 13754215.5.
Japanese Office Action dated Oct. 23, 2015 in corresponding Japanese Application No. 2012-043683 with an English Translation.
Decision to Grant a Patent dated Jun. 3, 2016 in corresponding Japanese Application No. 2012-043683.

* cited by examiner

VARIABLE GEOMETRY TURBOCHARGER

TECHNICAL FIELD

This invention relates to a variable geometry turbocharger used for an internal combustion engine such as an engine. More specifically, it relates to a blade shape of variable vanes included in a variable nozzle mechanism.

BACKGROUND

In an exhaust turbocharger having a relatively small size used for an internal combustion engine of an automobile or the like, employed is a structure where the exhaust gas from the engine is used to fill a scroll formed inside a turbine housing. The exhaust gas is then let through a plurality of nozzle vanes disposed on the inner circumferential side of the scroll so as to act on the turbine rotor disposed on the inner circumferential side of the nozzle vanes. A variable geometry turbocharger which includes a variable nozzle mechanism having a plurality of nozzle vanes capable of varying their blade angles has been widely used.

FIG. 8 is an illustration of an example of a variable geometry turbocharger having a variable nozzle mechanism. FIG. 8 is a partial cross-sectional view taken along the rotational shaft center K. As illustrated in the drawing, the variable geometry turbocharger 1 includes a turbine housing 3. A scroll 5 is formed into a spiral shape on the outer circumferential part on the upstream side of the turbine housing 3. On the other hand, a turbine wheel 7 is disposed on the inner circumferential part of the turbine housing 3. The rotational center of the turbine shaft 9, to which the turbine wheel 7 is mounted, is the rotational shaft center K and coaxial with a compressor (not illustrated). The turbine shaft 9 is rotatably supported by a bearing housing 13 via a bearing 11.

A recess of an annular shape is formed on the back face of the bearing housing 13. This recess houses a variable nozzle mechanism 19 being a nozzle assembly including nozzles 15, a nozzle mount 17, a nozzle plate 18, etc. Each nozzle 15 has a nozzle vane 15a and a nozzle shaft 15b. A plurality of nozzle vanes 15a are disposed around the rotational shaft center K at predetermined intervals at the inner circumferential side of the scroll 5 so as to surround the outer circumference of the turbine wheel 7 at a position relative to the radial direction of the turbine. The nozzle shafts 15b are supported on the nozzle mount 17 fixed to a bearing housing 13 so as to be rotatable around the movable center C. The variable nozzle mechanism 19 is configured such that the blade angles of the nozzle vanes 15a are varied upon receiving rotational force from an actuator via a link mechanism 21.

FIG. 9 is a cross-sectional view taken along the line A-A as seen in the direction of the arrows of FIG. 8. As illustrated in FIG. 9, a nozzle throat 23 is formed between one of the nozzle vanes 15a and adjacent one of the nozzle vanes 15a. The exhaust gas G flows into the turbine wheel 7 through the nozzle throat 23. The opening degree of the flow path of the nozzle throat 23 is controlled by rotation of the nozzle shaft 15b of the nozzle vane 15a. The nozzle shaft 15b is controlled to rotate in the closing direction that closes the nozzle throat 23 when the flow rate of the exhaust gas is low, while it is controlled to rotate in the opening direction that opens the nozzle throat 23 when the flow rate of the exhaust gas is high.

Further, as illustrated in FIG. 9, across the nozzle vanes 15a and the nozzle throats 23 formed between the nozzle vanes 15a, the scroll 5 side being the outer circumferential side becomes the high pressure side H and the turbine wheel 7 side being the inner circumferential side becomes the low pressure side U due to the exhaust gas G injected as a drive fluid.

Accordingly, due to the pressure difference between the static pressure acting on the pressure surface 25 of the nozzle vane 15a adjacent to the high pressure side H and the static pressure acting on the suction surface 27 adjacent to the low pressure side U, a moment M (−) is generated in the closing direction of the nozzle throat 23 at the leading edge 29 side of the nozzle vane 15a, while a moment M (+) is generated in the opening direction at the trailing edge 31 side, the moments M (−) and M (+) acting on the nozzle vane 15a around the nozzle shaft 15b as the center of rotation.

If the balance of the moment M (−) in the closing direction acting on the leading edge 29 side caused by the static pressure and the moment M (+) in the opening direction acting on the trailing edge 31 side fluctuates to switch the directions of the moments acting on nozzle vane 15a, hysteresis occurs due to the backlash of the link mechanism 21 or the like that operates the variable nozzle mechanism 19, which raises an accuracy problem in the nozzle control. Further, there has been a problem that, in the case in which the moment M (−) in the closing direction is larger, a trouble in the drive system such as the actuator of the variable nozzle mechanism 19 leads to closure of the nozzle path, stopping operation of the variable nozzle mechanism 19.

In view of the above problems, JP2009-517578 (Patent Document 1) and JP2003-254074 (Patent Document 2) disclose modifying the shapes of the upper and lower surfaces of the vanes to adjust the rotation moments acting on the nozzle vanes caused by the pressure of the operating fluid acting on the upper and lower surfaces of the vanes.

CITATION LIST

Patent Literature

Patent Document 1: JP2009-517578
Patent Document 2: JP2003-254074

SUMMARY

Technical Problem

It may be considered to increase the blade length of a nozzle vane for the purpose of improving the efficiency of the turbine at low speed. In such case, if the position of the rotational center is shifted to the leading edge side in the blade length direction, it would be possible to enhance the moment in the opening direction. However, changing the position of the rotational center may require modification of the drive link mechanism, which results in extensive modification of the design. Thus, it is necessary to enable obtaining a sufficient moment in the opening direction of the blade with respect to the blade length direction without changing the position of the rotational center of the nozzle vane.

Further, if the moments acting on the nozzle vanes switch their directions, hysteresis occurs in the control of the variable nozzle mechanism, which is likely to raise problems of the accuracy and stability in the nozzle control. Thus, it is necessary to make such a blade shape that has high moment characteristic.

As illustrated in FIG. 10, Patent Document 1 discloses forming the cross-sectional center line 02 of the blade 01 into a wavy shape so as to generate a moment in the opening direction acting on the blade 01. The blade 01 is defined by the cross-sectional lower side 03 and the cross-sectional upper side 05, between which the cross-sectional center line 02 extends from the blade leading edge to the blade trailing edge. The outline of the cross-sectional center line 02 of the blade 01 has a wavy shape having two antinodes 02A, 02B facing each other. When plotted on an x-y coordinate, the first antinode 02A of the cross-sectional center line 02 is a range 09 that begins at the blade leading edge 07, and has negative Y values between the leading edge 07 and a zero passage point of the cross-sectional center line 02 passing through the leading edge 07 and the X axis, while the second antinode 02B is a range 013 that always has positive Y values from the zero passage point of the cross-sectional center line 02 passing through the X axis to the blade trailing edge 011.

However, the range on the trailing edge 011 side of the upper side of the blade is the range 013 that always has positive Y values. That is, this range has a shape curved into a convex shape. Thus, at the trailing edge 011 side of the upper side of the blade, the flow path of the nozzle throat formed between adjacent blades is narrowed, increasing the flow velocity of the exhaust gas flowing through the nozzle throat and decreasing the static pressure. As a result, the force pressing down the trailing edge is reduced, which makes it difficult to sufficiently obtain a moment in the opening direction of the blade.

Further, as illustrated in FIG. 11, Patent Document 2 discloses cutting off the nozzle vane 020 on the suction surface 022 side throughout a predetermined distance Q from the leading edge 021 of the nozzle vane 020 so as to obtain a shape in which the thickness of the blade is reduced. The nozzle throat facing the deformed part 023 of the leading edge 021 side of the suction surface 022 of the nozzle vane 020 is enlarged. As a result, the flow velocity of the drive fluid in the nozzle throat decreases and the static pressure increases, enhancing the force that forces the leading edge up and thereby reducing the moment in the closing direction acting on the leading edge 021 side.

However, the above is to adjust the shape of the leading edge 021 side of the suction surface 022 of the nozzle vane 020. Thus, it does not disclose adjusting the trailing edge side of the pressure surface side. Further, since the shape of the suction surface side is adjusted, advantageous effects for the moment on the nozzle vane cannot be effectively achieved compared to the case in which the pressure surface side is deformed.

The present invention was made in view of the above problems. An object is, in a variable geometry turbocharger including a variable nozzle mechanism, to enhance safety upon malfunction of the variable nozzle mechanism as well as to improve the accuracy of control for the variable nozzle mechanism by causing the moment to act on the nozzle vanes securely and stably in the opening direction even if the shape of the nozzle vane is extended in order to improve efficiency at low speed.

Solution to Problem

In order to solve the above problems, a variable geometry turbocharger includes: a plurality of nozzle vanes disposed at predetermined intervals around a rotational shaft center of a turbine wheel so as to surround an outer circumferential side of the turbine wheel, the nozzle vanes being disposed at an inner circumferential side of a scroll formed inside a turbine housing; and a variable nozzle mechanism configured capable of changing a blade angle of each of the nozzle vanes, each of the nozzle vanes having a blade cross-section orthogonal to a rotational center axis of each nozzle vane, the blade cross-section having: a concave portion curved into a concave shape on at least a part of a pressure surface side, the part being disposed at a trailing edge side with respect to the rotational center; and a convex portion at a leading edge side with respect to the rotational center, so that a surface shape of the pressure surface side is a substantially S-shape having the concave portion and the convex portion across a boundary at a same longitudinal position as the rotational center.

According to the present invention, the blade cross-section, which is orthogonal to the rotational center axis of the nozzle vane, has a concave portion curved into a concave shape on at least a part of the pressure surface side, the part being disposed at a trailing edge side with respect to the rotational center. Thus, the flow-path area of the nozzle throat defined between two adjacent nozzle vanes is increased, thereby decreasing the flow velocity of the exhaust gas and increasing the static pressure. That is, the load acting on the nozzle vane is increased. As a result, the moment acting in the opening direction of the nozzle vane is increased at the pressure surface side of the trailing edge side with respect to the rotational center.

Further, the leading edge side with respect to the rotational center is formed into a convex shape so that the surface shape of the pressure surface side is a substantially S-shape having the concave portion and the convex portion across a boundary at a same longitudinal position as the rotational center. Thus, the load is increased by the concave part at the trailing edge side to increase the pressure, while the convex portion formed on the leading edge side reduces the pressure of the flow of the exhaust gas inside the nozzle throat by increase in the turning angle and decrease in the flow-path area of the nozzle throat. As a result, it is possible to enhance the moment acting in the opening direction of the nozzle vane.

Accordingly, it is possible to improve safety upon malfunction of the variable nozzle mechanism by securely applying a moment that acts on the nozzle vane in the opening direction. Also, it is possible to apply the moment in the opening direction to the nozzle vane constantly. As a result, the accuracy problem in the nozzle control is prevented, which could be raised due to hysteresis in control of the variable nozzle mechanism caused by switching directions of the moments acting on the nozzle vanes.

Further, preferably in the present invention, each of the nozzle vanes may have a stagnation point on which an exhaust gas flow that flows into a leading edge portion hits the blade surface and stagnates at the leading edge portion, and an inclination angle of a blade surface at the stagnation point may be set so as to reduce a moment in a closing direction around the rotational center caused by the exhaust gas flow hitting each nozzle vane.

With the above configuration, in addition to the improvement of the moment characteristic of the nozzle vane due to the shape of the pressure surface side, it is possible to, with the collision energy of the exhaust gas flow acting so as to reduce the moment acting in the closing direction of the nozzle vane, apply the moment in the opening direction of the nozzle vane even more securely to enhance safety upon malfunction of the variable nozzle mechanism, as well as to apply the moment in the opening direction to the nozzle vane constantly.

Further, preferably in the present invention, the inclination angle between a line connecting the stagnation point with the rotational center and a tangent line direction of the blade surface may be set to be greater than 30 degrees at a distance of not less than 0.7, where a distance from the rotational center to a leading edge is defined as 1 in a blade chord length direction that connects the leading edge and a trailing edge.

As a result, it is possible to reduce the moment acting in the closing direction of the nozzle vane due to the collision of the exhaust gas flow and thereby to securely apply and enhance the moment in the opening direction.

Further, preferably in the present invention, a blade thickness of the leading edge side may be set to be thicker such that a ratio T of a blade thickness Y to a blade thickness X (T=Y/X) is greater than 2 so that the pressure surface side is formed into the substantially S-shape, where the blade thickness Y is a thickness at half a distance from the rotational center to a leading edge in the blade chord length direction that connects the leading edge to the trailing edge and the blade thickness X is a thickness at half a distance from the rotational center to the trailing edge.

As described above, the blade thickness at the leading edge side is set to be thicker, so that, in the direction of the blade chord length connecting the leading edge and the trailing edge, the ratio T of the blade thickness X at half a distance from the rotational center to the trailing edge to the blade thickness Y at half a distance from the rotational center to the leading edge (T=Y/X) is set to be greater than 2, so as to form the shape of the pressure surface side into a substantially S-shape. Thus, as described above, the turning angle of the exhaust gas flow inside the nozzle throat is increased. Also, the pressure at the pressure surface side of the leading edge decreases due to reduction of the flow-path area of the nozzle throat. As a result, it is possible to effectively obtain the moment acting in the opening direction of the nozzle vane.

Further, in the present invention, a variable geometry turbocharger includes: a plurality of nozzle vanes disposed at predetermined intervals around a rotation shaft center of a turbine wheel so as to surround an outer circumferential side of the turbine wheel at an inner circumferential side of a scroll formed inside a turbine housing; and a variable nozzle mechanism configured capable of changing a blade angle of each of the nozzle vanes, wherein each of the nozzle vanes has a blade cross-section orthogonal to a rotational center axis of each nozzle vane, the blade cross-section being formed into a convex shape at a leading edge side with respect to the rotational center, and wherein each of the nozzle vanes has an inclination angle of a blade surface at a stagnation point on which an exhaust gas flow that flows into a leading edge portion hits the blade surface and stagnates at the leading edge portion, the inclination angle being formed nearly vertical with respect to the blade chord length direction connecting a leading edge and a trailing edge so as to reduce a moment in a closing direction around the rotational center caused by the exhaust gas flow.

According to the present invention, the blade cross-sectional shape orthogonal to the rotation center shaft of the nozzle vane has a convex shape at the leading edge side with respect to the rotational center. At the stagnation point where the exhaust gas flow stagnates at the leading edge side by the exhaust gas that inflows toward the leading edge hitting the blade surface, the nozzle vane is formed so that the inclination angle of the blade surface at the stagnation point is nearly vertical with respect to the blade chord length direction connecting a leading edge and a trailing edge so as to reduce a moment in a closing direction around the rotational center caused by the exhaust gas flow, thereby generating the moment acting in the opening direction of the nozzle vanes by the exhaust gas flow. Thus, it is possible to apply the moment in the opening direction of the nozzle vane securely to enhance safety upon malfunction of the variable nozzle mechanism. Further, it is possible to apply the moment in the opening direction to the nozzle vane constantly. As a result, occurrence of the accuracy problem in the nozzle control is prevented, which could be raised due to hysteresis in control of the variable nozzle mechanism caused by switching directions of the moments acting on the nozzle vanes.

Advantageous Effects

According to the present invention, in a variable geometry turbocharger including a variable nozzle mechanism, it is possible to enhance safety upon malfunction of the variable nozzle mechanism as well as to improve accuracy of the control of the variable nozzle mechanism by applying the moment that acts on the nozzle vanes in the opening direction securely and stably even if the shape of the nozzle vane is extended for the purpose of improving efficiency at low speed.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

(First Embodiment)

Figure 8:
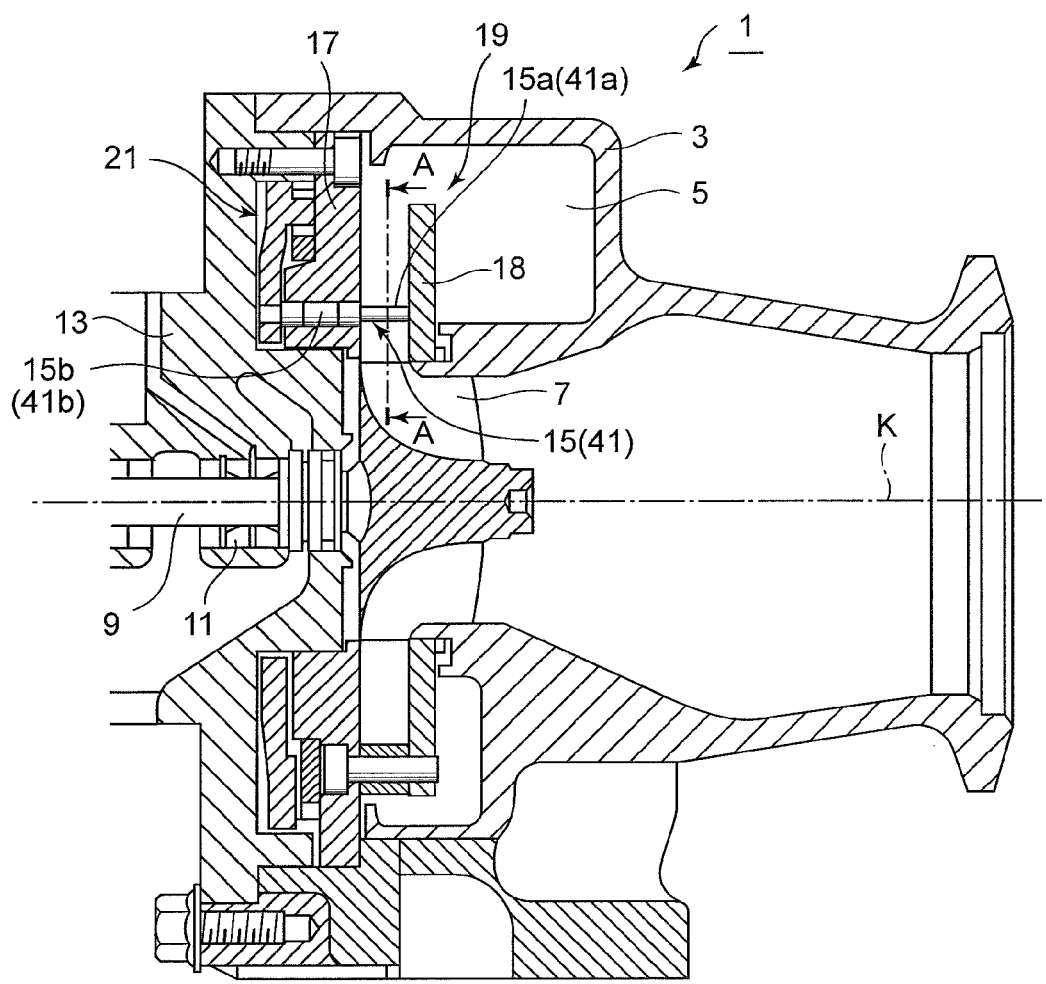
FIG. 8 is a diagram of the overall configuration of a variable geometry turbocharger.
Figure 9:
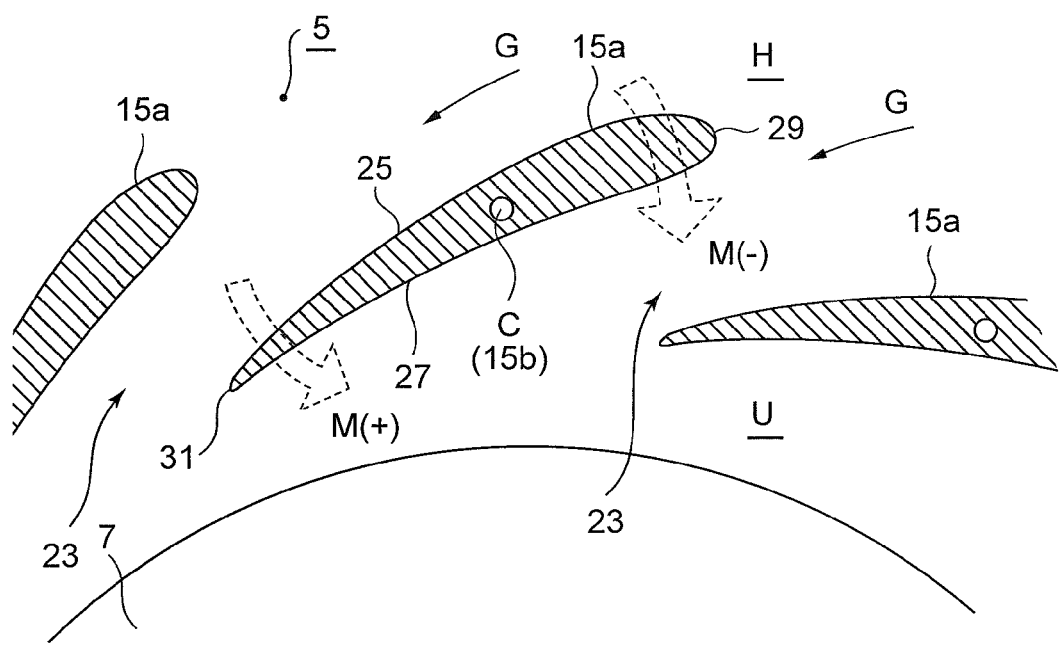
FIG. 9 is a cross-sectional view taken along the line A-A as seen from the arrows in FIG. 8.
Figure 10:
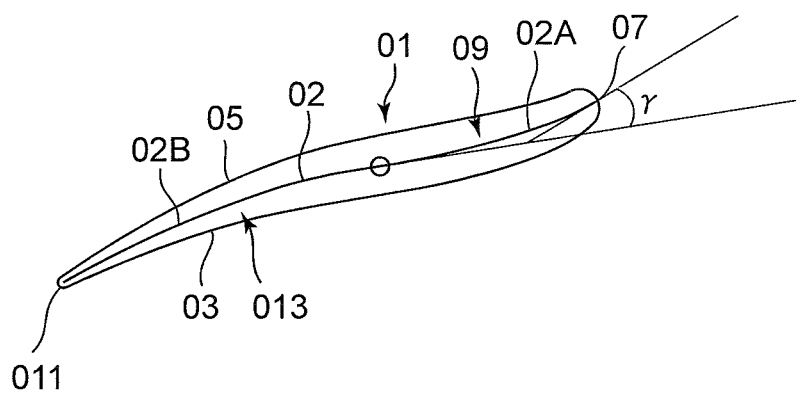
FIG. 10 is a cross-sectional view of the shape of a nozzle vane of the prior art.
Figure 11:
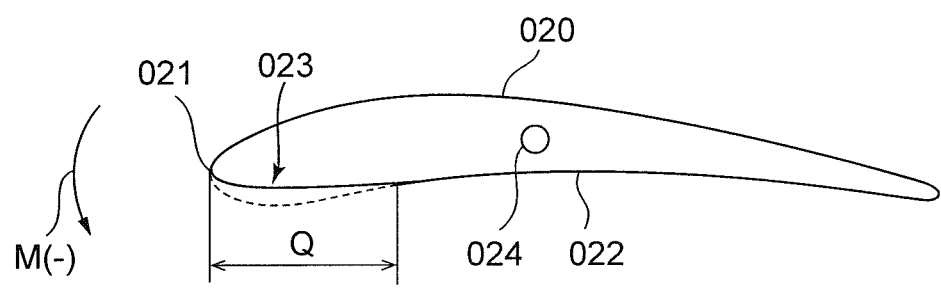
FIG. 11 is a cross-sectional view of the shape of another nozzle vane of the prior art.

FIG. 8 illustrates an example of a variable geometry turbocharger having a variable nozzle mechanism. Also, FIG. 8 is a partial cross-sectional view taken along the rotational shaft center K. As illustrated in the drawing, the variable geometry turbocharger 1 includes a turbine housing 3, and a scroll 5 of a spiral shape is formed on the outer circumferential part on the upstream side of the turbine housing 3. On the other hand, a turbine wheel 7 is disposed on the inner circumferential part of the turbine housing 3. The turbine wheel 7 is mounted to a turbine shaft 9, whose rotational center is the rotational shaft center K in the drawing and coaxial with a compressor (not illustrated). Further, the turbine shaft 9 is rotatably supported on a bearing housing 13 via a bearing 11.

A recess part of an annular shape is formed on the back face of the bearing housing 13. This recess part houses a variable nozzle mechanism 19, which is a nozzle assembly including nozzles 15, a nozzle mount 17, a nozzle plate 18, etc. Each of the nozzles 15 includes a nozzle vane 15a and a nozzle shaft 15b. The nozzle vanes 15a are disposed so as to surround the outer circumference of the turbine wheel 7 with respect to the radial direction of the turbine, and so as to be positioned on the inner circumferential side of the scroll 5 around the rotational shaft center K at predetermined intervals. Further, the nozzle shafts 15b are supported on the nozzle mount 17 fixed to the bearing housing 13 so as to be rotatable around the movable center C. Moreover, the variable nozzle mechanism 19 is configured so that the blade angles of the nozzle vanes 15a are varied upon receiving rotational force from an actuator through a link mechanism 21.

The above described part of the overall configuration of the variable geometry turbocharger according to the first embodiment is similar to the configuration described as the conventional art.

Figure 1:
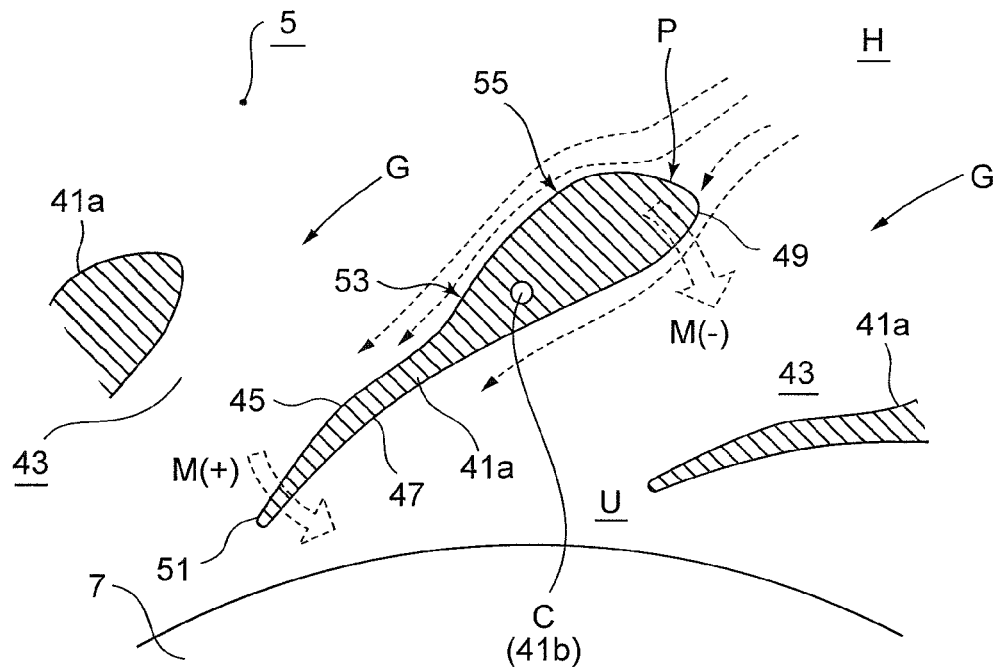
FIG. 1 is an explanatory diagram of the cross-sectional shape of a nozzle vane according to the first embodiment, and action of the pressure thereof.

Next, the nozzle vanes 41a of the present embodiment will be described. FIG. 1 is a cross-sectional view taken along the line A-A of FIG. 8 as seen in the direction indicated by the arrows, illustrating a nozzle vane of the present embodiment.

As illustrated in FIG. 1, a nozzle throat 43 is defined between the nozzle vane 41a and adjacent nozzle vane 41a. The exhaust gas G flows into the turbine wheel 7 from the nozzle throat 43. The opening degree of the flow path of the nozzle throat 43 is controlled by rotation of the nozzle shaft 41b of the nozzle vane 41a. The rotation is controlled to be in closing direction of the nozzle throat 43 upon low flow rate of the exhaust gas and in opening direction of the nozzle throat 43 upon high flow rate of the exhaust gas.

Further, as illustrated in FIG. 1, the scroll 5 side, which is the outer circumferential side, becomes a high pressure side H while the turbine wheel 7 side, which is the inner circumferential side, becomes a low pressure side U across the nozzle vanes 41a and the nozzle throats 43 formed between the nozzle vanes 41a due to the exhaust gas G injected as a drive fluid.

Accordingly, due to the pressure difference between the static pressure acting on the pressure surface 45 of the nozzle vane 41a adjacent to the high pressure side H and the static pressure acting on the suction surface 47 adjacent to the low pressure side U, a moment M (−) in the closing direction of the nozzle throat 43 is generated at the leading edge 49 side of the nozzle vane 41a, while a moment M (+) in the opening direction is generated at the trailing edge 51 side, the nozzle shaft 41b being the rotational center.

Figure 2:
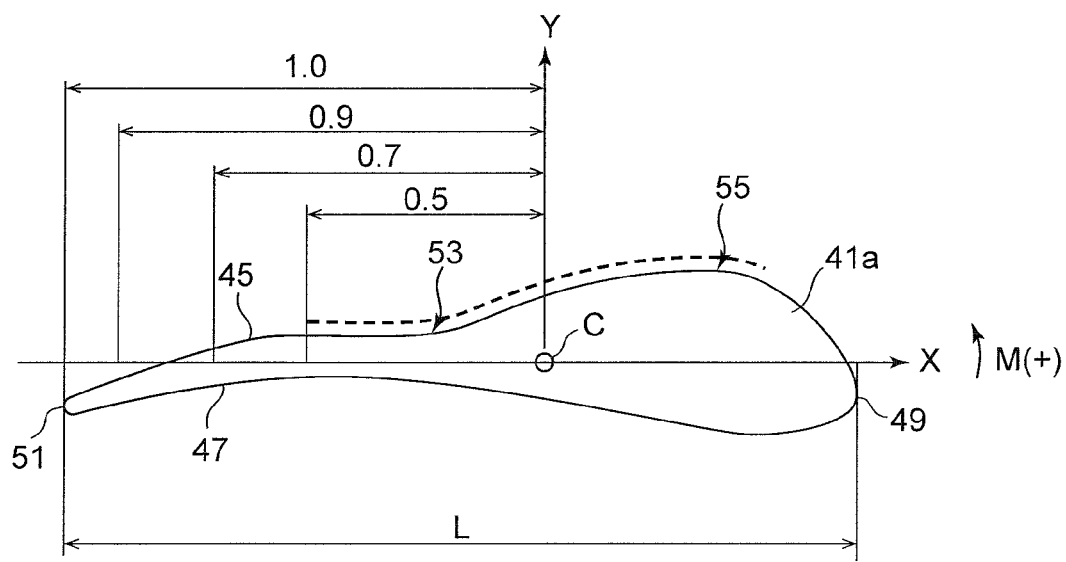
FIG. 2 is an explanatory diagram of the cross-sectional shape of the nozzle vane according to the first embodiment.

FIG. 2 illustrates a cross-sectional shape of the nozzle vane 41a in a coordinate system where x-axis passes through the rotational center C of the nozzle shaft 41b, x-axis being parallel to the direction of the chord length L connecting the leading edge 49 and the trailing edge 51, and y-axis is orthogonal to x-axis.

A concave portion 53 curved into a concave shape is disposed in at least a part at the pressure surface 45 side, i.e. as illustrated in the drawing in the present embodiment, in a range from the rotational center C to a position of approximately 0.5, where the distance from the rotational center C to the trailing edge is defined as 1. The leading edge 49 side has a convex portion formed into a convex shape across a boundary at a same longitudinal position as the rotational center C. Accordingly, the surface shape of the pressure surface 45 side is formed into a substantially S-shape (the S-shape indicated by the thick dotted line in FIG. 2) having the concave portion and the convex portion across a boundary at a same longitudinal position as the rotational center C.

As described above, the concave portion 53 curved into a concave shape is provided. As a result, the flow-path area of the nozzle throat 43 defined between adjacent two of the nozzle vanes is increased, thereby reducing the velocity of the exhaust gas flow and increasing the static pressure. Thus, the moment M (+) in the opening direction of the nozzle vane 41a is applied on the pressure surface 45 side of the trailing edge 51 side with respect to the rotational center C.

The range in which the concave portion 53 is formed may be up to 0.7 or up to 0.9. However, it is preferable to form the concave portion 53 in the range of 0.5, because the concave portion 53 being formed in a wide range weakens the effect of reducing the flow velocity using the concave portion 53 to increase the load and the static pressure.

Further, the convex portion 55 is formed into a convex shape at the leading edge 49 side with respect to the rotational center C so as to form the surface shape of the pressure surface side into a substantially S-shape having the concave portion 53 and the convex portion 55 across a boundary at a same longitudinal position as the rotational center C. Thus, the concave portion 53 at the trailing edge 51 side increases load and pressure, while the convex portion 55 of a convex shape formed at the leading edge 49 side increases the turning angle of the exhaust gas flow in the nozzle throat 43 and reduces the flow-path area of the nozzle throat 43, thereby reducing the pressure of the exhaust gas flow. As a result, a moment acts in the opening direction of the nozzle vane 41a.

According to the present embodiment, with the substantially S-shape of the pressure surface 45 formed by the concave portion 53 at the trailing edge 51 side and the convex portion 55 at the leading edge 49 side, it is possible to securely apply the moment that acts on the nozzle vane 41a in the opening direction to the nozzle vane 41a so as to enhance safety upon malfunction of the variable nozzle mechanism 19, as well as to apply the moment in the opening direction on the nozzle vane 41a constantly. As a result, occurrence of the accuracy problem in the nozzle control is prevented, which could be raised by hysteresis due to the back lash of the link mechanism 21 or the like that controls the variable nozzle mechanism 19 caused by switching directions of the moments acting on the nozzle vanes 41a.

Figure 3:
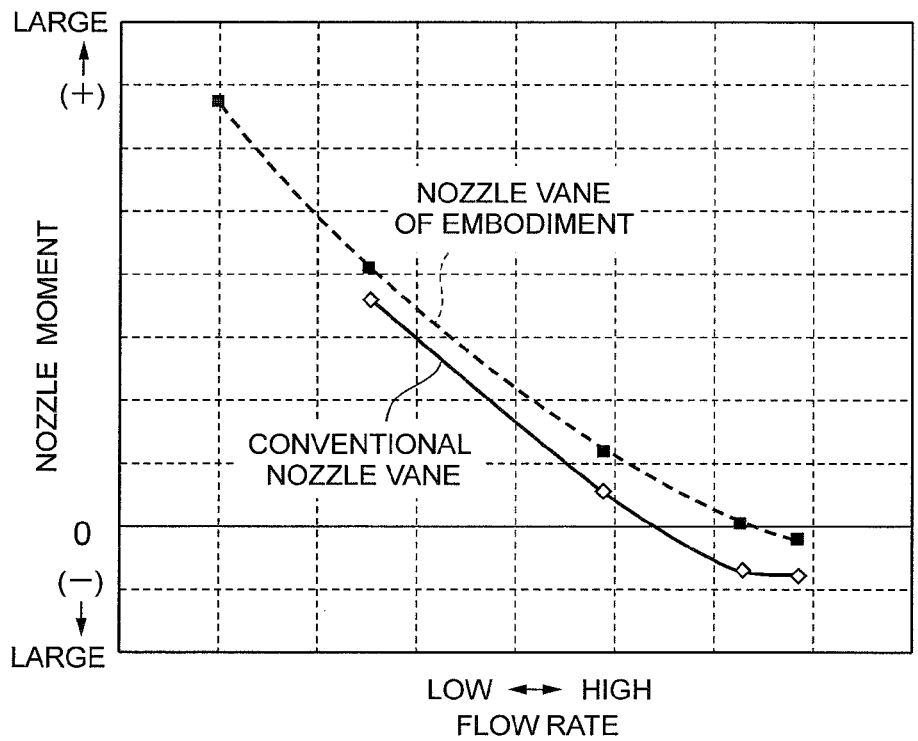
FIG. 3 is a comparison graph of the moment characteristic of the first embodiment to that of a conventional shape.

FIG. 3 is a comparison graph of the moment characteristic. Compared to the case of the conventional shape (solid line), the moment M (+) acting in the opening direction increases throughout the entire region from the low flow rate side to the high flow rate side in the case of the shape of the present embodiment (dotted line).

In the graph, x-axis is the flow rate of the exhaust gas and y-axis is the size of the moment. The plus and minus signs indicate that the direction of the moment is reversed. Thus, it is illustrated that the moment is reversed at the high flow rate side but the moment is in one direction throughout basically the entire region.

Figure 4A:
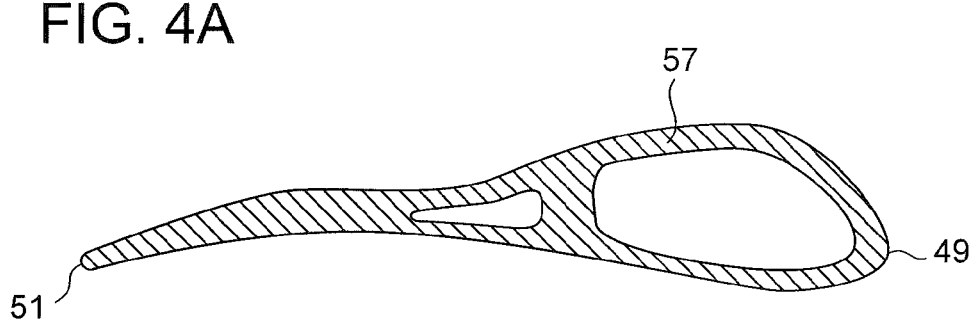
FIGS. 4A and 4B are explanatory diagrams of the hollow structure of the nozzle vane.

For the nozzle vane 41a having large blade thickness at the leading edge 49 side as in the present embodiment, using a solid material for its formation may lead to a problem of increased weight and cost. Thus, by adopting a hollow structure as the nozzle vane 57 illustrated in FIG. 4A, it is possible to reduce the weight and material cost. Precision casting may be used.

Figure 4B:
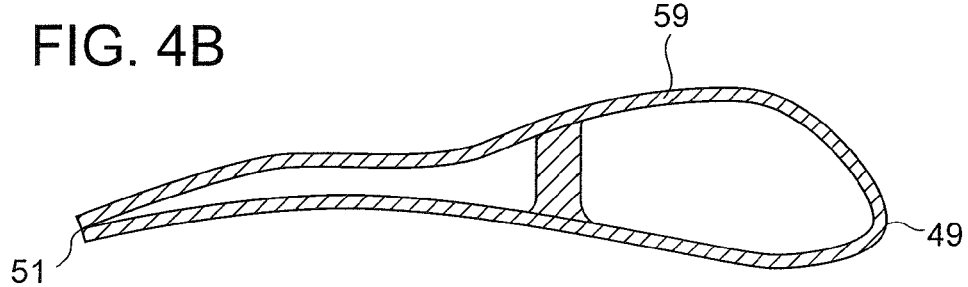

Further, by using metal plates as the nozzle vane 59 illustrated in FIG. 4B, it is possible to facilitate its formation by simply assembling by bending and welding the metal plates, for instance.

(Second Embodiment)

Next, the second embodiment will be described in reference to FIGS. 5 and 6.

Figure 5:
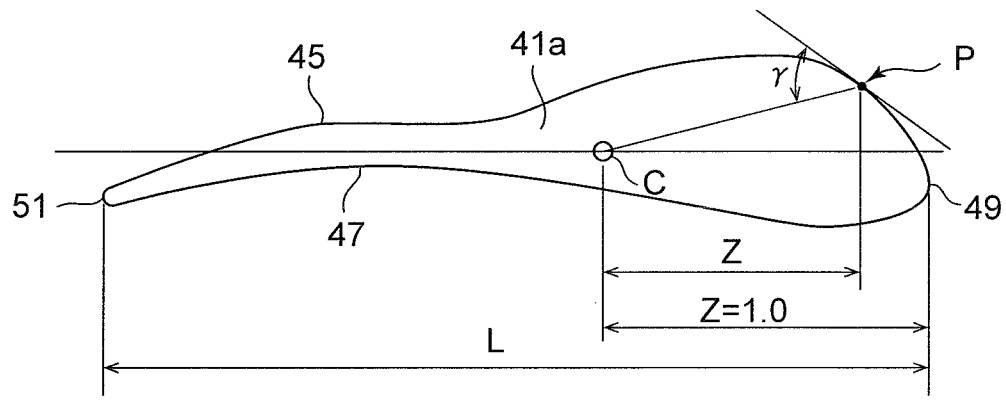
FIG. 5 is an explanatory diagram of the cross-sectional shape of a nozzle vane according to the second embodiment.

The second embodiment is to specify the inclination angle of the blade surface at the stagnating point in the shape of the blade surface of the leading edge 49 side as illustrated in FIG. 5.

As illustrated in FIG. 5, at the stagnating point P where the exhaust gas that flows into the leading edge 49 hits the blade surface and the exhaust gas flow stagnates at the leading edge 49, the inclination angle γ of the blade surface at the stagnation point is set such that the moment M (−) in the closing direction around the rotational center C of the nozzle vane 41a is reduced by the collision energy of the exhaust gas flow.

That is, the inclination angle γ in the tangential direction of the blade surface with respect to the line connecting the stagnating point P and the rotational center C is set to be larger than 30 degrees at a position of Z>0.7, where the distance Z from the rotational center C to the leading edge 49 parallel to the direction of the blade chord length L connecting the leading edge 49 and the trailing edge 51 is defined as 1.

In particular, the inclination angle γ may be set in stages in accordance with the value of Z. That is, it may be set to satisfy γ>30° at Z>0.7, γ>35° at Z>0.8, γ>40° at Z >0.9, and γ>50 at Z>0.95.

The inclination angle γ is set in a range where Z is greater than 0.7, because the stagnating point P shifts in accordance with the rotation of the nozzle vane 41a and appears in a range where Z is greater than approximately 0.7.

Figure 6:
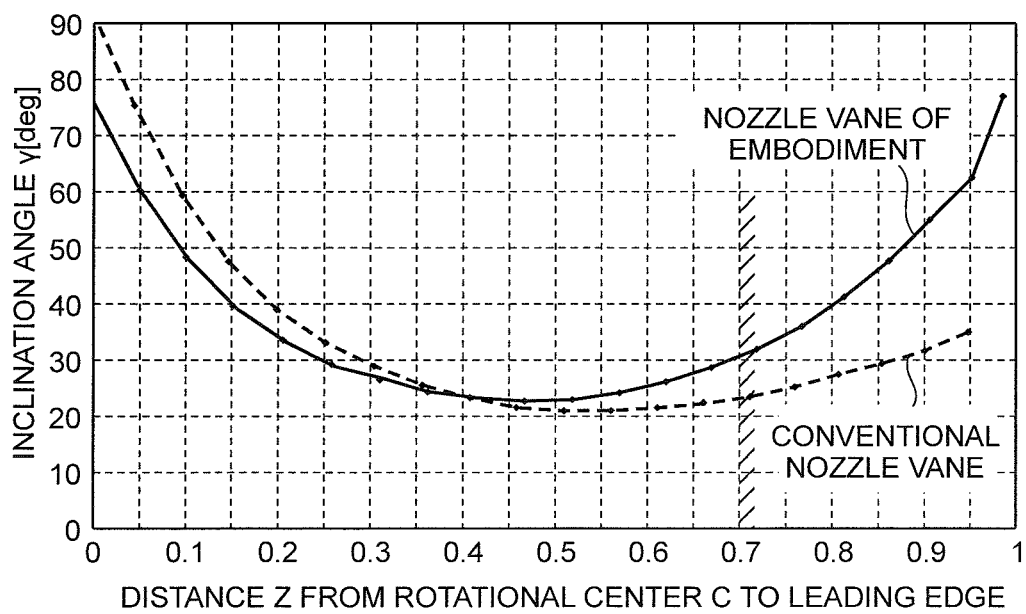
FIG. 6 is a graph showing the relationship between the distance from a rotational center to a stagnating point and the inclination angle of a blade surface.

The inclination angle γ for each position of Z is set based on a test result and on a shape of a nozzle vane having the inclination angle γ as illustrated in FIG. 6. Each angle is set in stages in accordance with the distance Z so as to reduce the moment acting in the closing direction of the nozzle vane by the collision of the exhaust gas flow. As a result, it is possible to apply the moment in the opening direction of the nozzle vane even more securely so as to increase safety upon malfunction of the variable nozzle mechanism, as well as to apply the moment in the opening direction to the nozzle vane constantly.

In FIG. 6, the dotted line represents the conventional original shape while the solid line represents a test piece of the present embodiment where the inclination angle γ of the blade surface at the stagnating point P is set such that the moment in the closing direction is reduced. For each section of the distance Z, a region of the desirable inclination angles γ is set as a range indicated by an arrow.

While the nozzle vane of this embodiment, which has been described as having improved the moment characteristic in FIG. 6, has a shape where the concave portion 53 is disposed on the trailing edge 51 side described in the first embodiment, it is still possible to improve the moment characteristic by only setting the inclination angle γ as described in this second embodiment.

(Third Embodiment)

Next, the third embodiment will be described in reference to FIG. 7.

Figure 7:
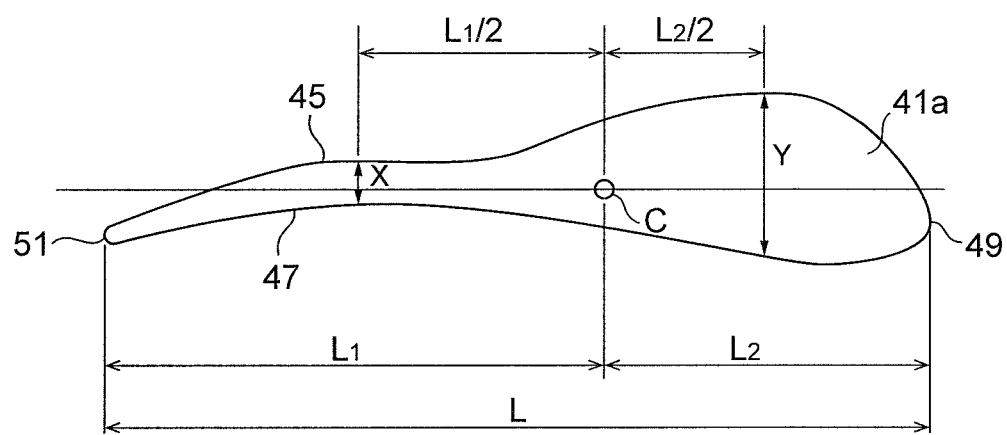
FIG. 7 is an explanatory diagram of the cross-sectional shape of a nozzle vane according to the third embodiment.

The third embodiment is to specify the ratio T of the blade thickness X to the blade thickness Y (T=Y/X), where the blade thickness X is a thickness at half a distance $L_1$ from the rotational center C to the trailing edge 51, and the blade thickness Y is a thickness at half a distance $L_2$ from the rotational center C to the leading edge 49, both in the direction of the blade chord length L that connects the leading edge 49 to the trailing edge 51 as illustrated in FIG. 7.

As illustrated in FIG. 7, in the direction of the blade chord length L connecting the leading edge 49 to the trailing edge 51, the blade thickness at the leading edge 49 is set to be thicker so that the ratio T of the blade thickness X at half a distance from the rotational center C to the trailing edge 51 in the blade chord length L to the blade thickness Y at half a distance from the rotational center C to the leading edge 49 in the blade chord length L is set to be greater than 2, so as to have the convex portion 55. As a result, the shape of the pressure surface 45 side is incorporated to the concave portion 53 at the trailing edge 51 side described in the first embodiment so as to form a substantially S-shape.

Accordingly, the turning angle of the exhaust gas flow inside the nozzle throat 43 is increased as described above. Further, the pressure decreases due to the reduction of the flow-path area of the nozzle throat 43. As a result, the moment acting in the opening direction of the nozzle vane 41a is securely generated.

It is preferable to set the value T (T=Y/X) to be greater than 2. However, when it is greater than 6, the leading edge 49 side becomes too thick, which leads to unbalance of the weight between the leading edge 49 side and the trailing edge 51 side, causing the rotation of the nozzle vane 41a to be unstable and the flow path resistance to occur relative to the exhaust gas flow inside the nozzle throat 43.

The above first to third embodiments may be implemented in combination.

INDUSTRIAL APPLICABILITY

According to the present invention, in a variable geometry turbocharger including a variable nozzle mechanism, it is possible to enhance safety upon malfunction of the variable nozzle mechanism as well as to improve accuracy in the control of the variable nozzle mechanism by applying the moment that acts on the nozzle vanes in the opening direction securely and stably even if the shape of the nozzle vane is extended in order to improve the efficiency at low speed. Thus, it is suitable for use in an exhaust turbocharger of a relatively small size used in an automobile internal combustion engine or the like.

The invention claimed is:

1. A variable geometry turbocharger comprising:
a plurality of nozzle vanes disposed at predetermined intervals around a rotational shaft center of a turbine wheel so as to surround an outer circumferential side of the turbine wheel, the plurality of nozzle vanes being disposed at an inner circumferential side of a scroll formed inside a turbine housing; and
a variable nozzle mechanism configured capable of changing a blade angle of each of the plurality of nozzle vanes, each of the plurality of nozzle vanes having a blade cross-section orthogonal to a rotational center axis of each of the plurality of nozzle vanes, the blade cross-section having: a concave portion curved into a concave shape on at least a part of a pressure surface side which is a scroll side, the part being disposed at a trailing edge side with respect to the rotational center axis; and a convex portion at a leading edge side with respect to the rotational center axis extending from the concave portion to a leading edge, so that a surface shape of the pressure surface side is a substantially S-shape having the concave portion and the convex portion across a boundary at a position of the rotational center axis.

2. The variable geometry turbocharger according to claim 1,
wherein each of the plurality of nozzle vanes has a stagnation point on which an exhaust gas flow that flows into a leading edge portion hits the blade surface and stagnates at the leading edge portion, and
wherein an inclination angle of a blade surface at the stagnation point is set so as to reduce a moment in a closing direction around the rotational center axis caused by the exhaust gas flow hitting each of the plurality of nozzle vanes.

3. The variable geometry turbocharger according to claim 2,
wherein the inclination angle between a line connecting the stagnation point with the rotational center axis and a tangent line direction of the blade surface is set to be greater than 30 degrees at a distance of not less than 0.7, where a distance from the rotational center axis to a leading edge is defined as 1 in a blade chord length direction that connects the leading edge and a trailing edge.

4. The variable geometry turbocharger according to claim 1,
wherein a blade thickness of the leading edge side is set to be thicker such that a ratio T of a blade thickness Y to a blade thickness X (T=Y/X) is greater than 2so that the pressure surface side is formed into the substantially S-shape, where the blade thickness Y is a thickness at half a distance from the rotational center axis to a leading edge in the blade chord length direction that connects the leading edge to the trailing edge and the blade thickness X is a thickness at half a distance from the rotational center axis to the trailing edge.

5. A variable geometry turbocharger comprising:
a plurality of nozzle vanes disposed at predetermined intervals around a rotation shaft center of a turbine wheel so as to surround an outer circumferential side of the turbine wheel at an inner circumferential side of a scroll formed inside a turbine housing; and
a variable nozzle mechanism configured capable of changing a blade angle of each of the plurality of nozzle vanes,
wherein each of the plurality of nozzle vanes has a blade cross-section orthogonal to a rotational center axis of each of the plurality of nozzle vanes, the blade cross-section having a convex portion formed into a convex shape at a pressure surface side which is a scroll side, the convex portion being disposed at a leading edge side with respect to the rotational center axis extending from a concave portion to a leading edge, and
wherein each of the plurality of nozzle vanes has an inclination angle of a blade surface at a stagnation point on which an exhaust gas flow that flows into a leading edge portion hits the blade surface and stagnates at the leading edge portion, the inclination angle being formed so as to reduce a moment in a closing direction around the rotational center axis caused by the exhaust gas flow.

* * * * *